United States Patent [19]

Buss

[11] 4,308,993

[45] Jan. 5, 1982

[54] HEATING SYSTEM

[75] Inventor: Linus B. Buss, Fountain Valley, Calif.

[73] Assignee: The Garrett Corporation, Los Angeles, Calif.

[21] Appl. No.: 90,190

[22] Filed: Nov. 1, 1979

[51] Int. Cl.³ .......................................... G05D 23/00
[52] U.S. Cl. .................................... 237/2 A; 237/11; 237/12.1; 237/81; 165/15; 60/648; 60/650
[58] Field of Search .................. 237/11, 12.1; 165/15; 98/1.5; 60/648, 650, 682; 62/401

[56] References Cited

U.S. PATENT DOCUMENTS

| 2,414,828 | 1/1947 | McCollum | 237/12.1 |
| 2,421,387 | 6/1947 | Lysholm | 60/650 |
| 2,491,461 | 12/1949 | Wood | 165/15 |
| 2,734,443 | 2/1956 | Wood | 165/15 |

Primary Examiner—Albert J. Makay
Assistant Examiner—Henry Bennett
Attorney, Agent, or Firm—Stuart O. Lowry; Joseph A. Yanny; Albert J. Miller

[57] ABSTRACT

A heating system which uses bleed air to heat and recirculate cabin air for the passenger space of a vehicle.

31 Claims, 1 Drawing Figure

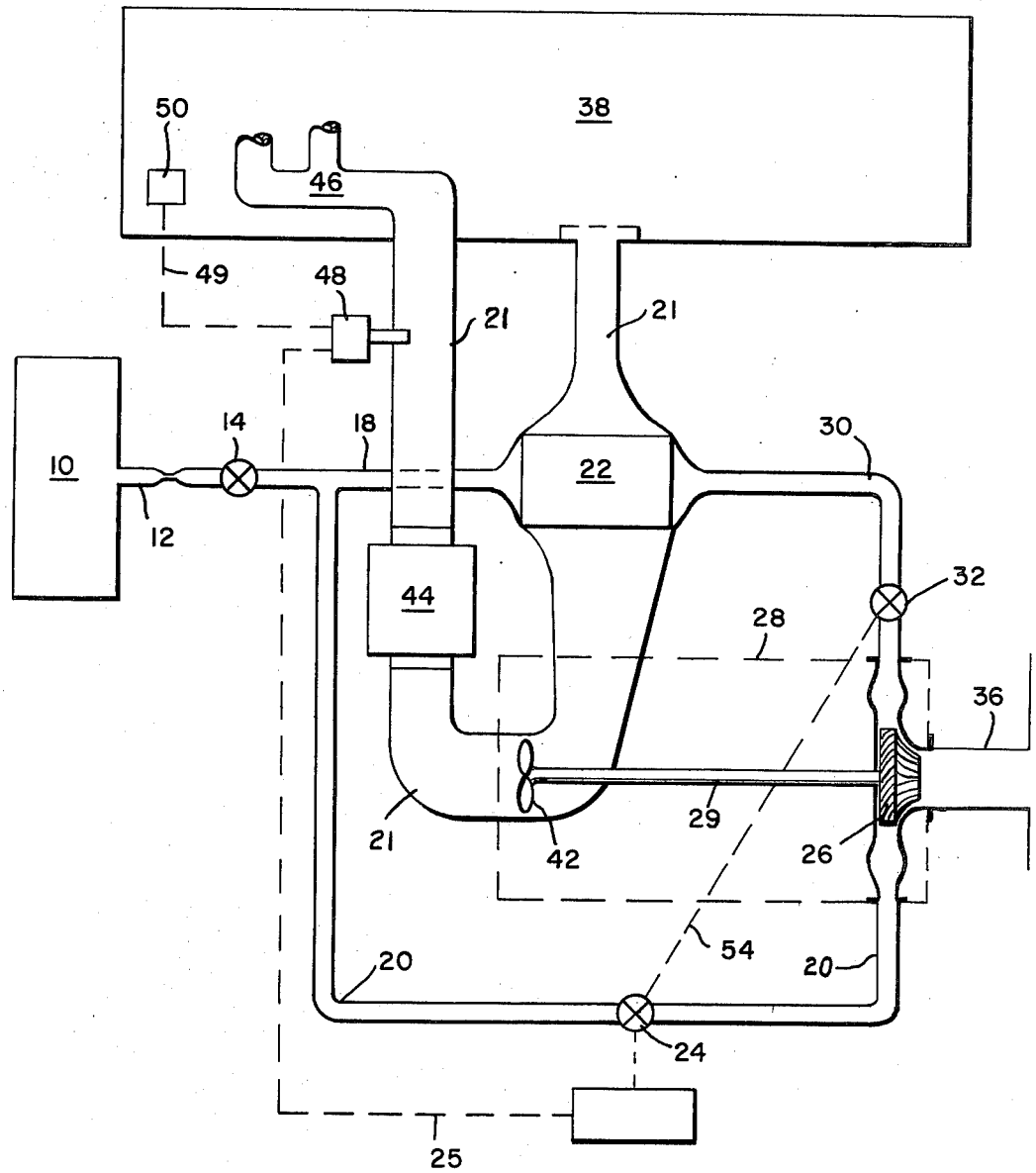

HEATING SYSTEM

BACKGROUND OF THE INVENTION

This invention relates to heating of aircraft cabins. More specifically, this invention relates to the use of engine bleed or compressor air to accomplish the heating.

Various devices have been used in the past for heating the cabins of aircraft. Among the more effective of these devices is the combustion heater. However, combustion heaters consume fuel from the aircraft's main engine fuel system, and present problems such as greater weight and complexity, increased fire hazard, and carbon monoxide poisoning.

The advent of gas turbine power plants with attendant large quantities of hot pressurized air has reduced the need for combustion heaters. A portion of the hot pressurized air, commonly referred to as bleed air, is used for direct heating of the cabin air. Such systems include, for example, direct infusion of the bleed air into the cabin space. However, these prior art systems are limited by an insufficiency of bleed air during certain phases of engine operation, or engine power penalties associated with use of bleed air for non-engine purposes. This requires the use of supplemental cabin heating means, such as a combustion heater or the like.

The present invention contemplates the more efficient use of the available quantity of bleed air for heating the cabin space of an aircraft. The bleed air is used to heat cabin air in a heat exchanger, and then to operate a heating device for additional heating of the cabin air. This results in the cabin being maintained at a comfortably warm temperature during phases of engine operation wherein the quantity of hot bleed air from the engine is at a minimum.

SUMMARY OF THE INVENTION

The heating system of this invention utilizes hot compressed air bled from the compressor section of a turbine power plant of a vehicle. This air, known as bleed air, is used for heating air which is circulated to the vehicle passenger space.

The system includes a heat exchanger mounted along a cabin air circulation path. Hot bleed air is routed to this heat exchanger for first stage heating of the cabin air. The system further includes an air cycle machine having a turbine located downstream of the heat exchanger in the bleed air path. This turbine is rotatably driven by the bleed air to extract additional energy from the bleed air, and the turbine in turn drives a fan of the air cycle machine. The fan is located in the cabin air stream, and serves to move the cabin air through the heat exchanger, to add further heat energy to the cabin air for second stage heating thereof, and to recirculate the cabin air to the cabin space.

BRIEF DESCRIPTION OF THE DRAWINGS

The accompanying FIGURE is a schematic diagram of the heating system of this invention.

DETAILED DESCRIPTION OF THE PREFERRED EMBODIMENT

The heating system of this invention is shown schematically in the accompanying drawing FIGURE. As shown, a source 10 of hot, high pressure air, such as the compressor of an aircraft turbine power plant, provides heated compressed air through suitable ducting means 12 to a pressure regulator and shut-off valve 14. The pressure regulator and shut-off valve 14 is modulated in a suitable manner to provide constant pressure bleed air into an inlet duct 18 coupled to a heat exchanger 22.

The bleed air passed through a first flow path in the heat exchanger 22, and therein transfers thermal energy to cabin or passenger space air circulating through a recirculation duct 21 and a second flow path in the heat exchanger 22. The bleed air thereafter passes through a turbine inlet duct 30 and a turbine inlet valve 32 to an air cycle machine, shown generally as 28. Within the air cycle machine 28, the bleed air rotatably drives a turbine 26 mounted on a shaft 29. The rotating turbine 26 extracts energy from the bleed air to rotatably drive a fan 42, after which the bleed air is exhausted to atmosphere via a discharge duct 36.

The fan 42 is positioned along the recirculation duct 21 to move the cabin air through the second flow path of the heat exchanger 22. More specifically, the fan 42 is, in the preferred embodiment, positioned along the recirculation duct 21 downstream of the heat exchanger 22 to draw the cabin air from the cabin space 38 of the vehicle through the recirculation duct 21 and the heat exchanger 22. This action of the fan 42 loads the turbine 26 to transfer energy extracted by the turbine from the bleed air stream to the cabin air stream. This energy transfer both heats the cabin air, and recirculates the cabin air to the cabin space 38 through a muffler 44 and a distribution duct 46.

A bypass duct 20 is connected between the heat exchanger inlet 18 and the air cycle machine turbine 26 to facilitate control of the heating system of this invention. A temperature control valve 24 is disposed along the bypass duct 20, and operates in conjunction with the turbine inlet valve 32 to control the degree of heating of the cabin air. As shown, a suitable mechanical linkage 54 or the like interconnects the valves 24 and 32 to operate the turbine inlet valve 32 generally inversely with respect to the temperature control valve 24.

In operation, in the event that maximum cabin heating is desired, the temperature control valve 24 is moved to a fully closed position, and the turbine inlet valve 32 is moved to a fully opened position. In this condition, the entire available quantity of bleed air flows through the heat exchanger 22 for maximum utilization of bleed air energy to heat the cabin air both in the heat exchanger 22 and by means of the air cycle machine 28. If a lesser amount of heating is desired, the temperature control valve 24 is modulated to a partially open position to allow some of the bleed air to pass through the bypass duct 20, thereby bypassing the heat exchanger 22 to flow directly to the air cycle machine turbine 26. This causes relatively less heat energy to be transferred to the cabin air. Further, if even less heating of the cabin air is desired, the temperature control valve 24 is moved to a fully open position, and the linkage 54 operates to move the turbine inlet valve 32 to a fully closed position. In this condition, bleed air does not pass through the heat exchanger 22, but instead is entirely cycled through the air cycle machine turbine 26 for maintaining full circulation and ventilation of the aircraft cabin space.

The temperature control valve 24 and the turbine inlet valve 32 may be operated by a conventional cabin temperature sensing system. As shown, this system comprises a thermostatic device 50 or the like located within the cabin space 38 for providing a signal on signal line 49 to control the set point of a sensor/controller unit 48 mounted along the recirculation duct 21 immediately upstream of the distribution duct 46. The sensor/controller unit 48 in turn provides a suitable control signal to the temperature control valve 24 via a signal line 25 to control the operation of the temperature control valve 24 and the turbine inlet valve 32, as described above.

The description of the preferred embodiment of the invention is not intended to limit the scope of the invention, but is intended to be exemplary of that which is specifically claimed as follows:

What is claimed is:

1. A method for heating an enclosure comprising the steps of:
    a. supplying air from a hot high pressure compressor bleed source through either a heat exchanger or a heat exchanger bypass duct and then through a turbine to drive the turbine and a fan connected for rotation therewith; and
    b. drawing air from the enclosure through the heat exchanger with the fan for heat exchange with the heat exchanger and for further heating of the air from the enclosure and for returning that air to the enclosure.

2. A heating method as set forth in claim 1 including the step of controllably connecting the bypass duct with the turbine to adjust the amount of heating of the air from the enclosure.

3. A heating method as set forth in claim 2 including the step of controlling the flow rate of source air through the heat exchanger, generally inversely to the flow rate of the source air through the bypass duct and in response to the temperature of the air in the enclosure.

4. A method of heating an enclosure comprising the steps of:
    a. controllably supplying fluid from a hot high pressure compressor bleed source through either a heat exchanger or a heat exchanger bypass duct and then through a turbine to drive the turbine and a fan connected for rotation therewith; and
    b. moving fluid with the fan from the enclosure through the heat exchanger for heat exchange therewith and for further heating the fluid from the enclosure, and for return of that fluid to the enclosure.

5. A heating method as set forth in claim 4 including the step of connecting said heat exchanger bypass duct directly to the turbine to adjust the amount of heating of the fluid from the enclosure.

6. A heating method as set forth in claim 5 including the step of controlling the flow rate of the source fluid through the heat exchanger.

7. A heating method as set forth in claim 5 including the step of controlling the flow rate of the source fluid through the heat exchanger generally inversely to the flow rate of the source fluid through the bypass duct.

8. A heating method as set forth in claim 5 including the step of controlling the flow rate of source fluid through the heat exchanger and through the bypass duct in response to the temperature of the fluid in the enclosure.

9. A heating method as set forth in claim 4 including the step of drawing the enclosure fluid through the heat exchanger with the fan.

10. A method of heating an enclosure comprising the steps of:
    a. supplying air from a hot high pressure compressor bleed source through a heat exchanger and then through a turbine to drive the turbine and a fan connected for rotation therewith;
    b. drawing air from the enclosure through the heat exchanger with the fan for heat exchange with the heat exchanger and for further heating of the air from the enclosure and for returning that air to the enclosure;
    c. controllably bypassing source air through a bypass duct around the heat exchanger to adjust the amount of heating of the air from the enclosure; and
    d. controlling the flow rate of source air through the heat exchanger generally inversely to the flow rate of the source air through the bypass duct and in response to the temperature of the air in the enclosure.

11. A heating system for heating an enclosure comprising:
    a. a compressor bleed source of hot fluid under pressure;
    b. a heat exchanger;
    c. a turbine and fan connected for simultaneous rotation;
    d. means for circulating fluid to be heated from the enclosure through the heat exchanger in heat exchange relationship therewith and then through the fan for further heating and for return to the enclosure; and
    e. a first source fluid flow path means for directing said source fluid through said heat exchanger in heat exchange relationship therewith and then through said turbine for driving the turbine;
    f. a second source fluid flow path heat exchanger bypass means for directing said source fluid from said source directly to said turbine for driving the turbine; and
    g. means for controlling the amount of source fluid flowing through said first and second source fluid flow path means to control the heat content of the fluid in the enclosure.

12. A heating system as set forth in claim 11 wherein the compressor bleed source of hot fluid under pressure comprises a source of hot pressurized air.

13. A heating system as set forth in claim 11 wherein the first means for directing source fluid includes:
    a. a heat exchanger inlet duct connected from the source to the heat exchanger for passage of the source fluid through the heat exchanger; and
    b. a turbine inlet duct connected from the heat exchanger to the turbine for passage of the source fluid through the turbine.

14. A heating system as set forth in claim 11 wherein the means for circulating fluid to be heated comprises a recirculation duct connected from the enclosure to the heat exchanger for passage of the fluid to be heated through the heat exchanger, and connected from the heat exchanger to the enclosure for return of the fluid to be heated to the enclosure.

15. A heating system as set forth in claim 14 wherein the fan is located within the recirculation duct downstream from the heat exchanger.

16. A heating system as set forth in claim 11 wherein the bypass means comprises a bypass duct connected from the source to the turbine.

17. A heating system as set forth in claim 16 wherein the means for controlling source fluid flow comprises a valve.

18. A heating system as set forth in claim 16 wherein the means for controlling source fluid flow comprises means responsive to the temperature of the fluid in the enclosure.

19. A heating system as set forth in claim 16 including a turbine inlet valve disposed along the first means for directing source fluid.

20. A heating system as set forth in claim 19 wherein the turbine inlet valve is disposed along the first means for directing source fluid at a location downstream of the heat exchanger and upstream of the turbine.

21. A heating system as set forth in claim 19 including:
   a. valve means for controlling source fluid flow through the bypass duct; and
   b. means for controlling the position of the turbine inlet valve for generally inverse source fluid flow through the first means for directing source fluid with respect to source fluid flow through the bypass duct.

22. A heating system for heating an enclosure comprising:
   a. a source of hot pressurized compressor bleed air;
   b. a heat exchanger;
   c. means forming a primary air flow path for controllably circulating air from the source either through the heat exchanger or through a heat exchanger bypass duct means;
   d. means forming a secondary air flow path for circulating air from the enclosure through the heat exchanger in heat exchange relation therewith and then for returning that air to the enclosure to control the heat content of the air in the enclosure; and
   e. an air cycle machine having a turbine disposed along the primary air flow path downstream of the heat exchanger for rotational driving by the air in the primary air flow path, and a fan rotatable with the turbine and disposed along the secondary air flow path for heating of the air therein, and for moving that air for return to the enclosure.

23. A heating system as set forth in claim 22 wherein the bypass duct means directly connects the source to the turbine, and further includes means for controlling source air flow through the bypass duct.

24. A heating system as set forth in claim 23 wherein the means for controlling source air flow through the bypass duct means includes means responsive to the temperature of the air in the enclosure.

25. A heating system as set forth in claim 24 including a turbine inlet valve disposed along the primary air flow path between the heat exchanger and the turbine.

26. A heating system as set forth in claim 25 including means for controlling the position of the turbine inlet valve for generally inverse source air flow through the heat exchanger primary air flow path with respect to source air flow through the bypass duct means.

27. A heating system as set forth in claim 22 wherein the fan is disposed along the secondary air flow path downstream of the heat exchanger.

28. A heating system for heating an enclosure comprising:
   a. a source of hot pressurized compressor bleed air;
   b. a heat exchanger;
   c. a primary conduit for circulating air from the source through the heat exchanger;
   d. a secondary conduit for circulating air from the enclosure through the heat exchanger in heat exchange relation therewith, and then for returning that air to the enclosure to control the temperature of the air in the enclosure;
   e. an air cycle machine having a turbine disposed within the primary conduit downstream of the heat exchanger for rotational driving by the air from the source, and a fan rotatable with the turbine and disposed within the secondary conduit downstream of the heat exchanger for heating of the air within the secondary conduit and for moving that air for return to the enclosure; and
   f. bypass means connected from the source to the turbine for controllably bypassing source air around the heat exchanger.

29. A heating system as set forth in claim 28 including a temperature control valve disposed within the bypass means.

30. A heating system as set forth in claim 29 including means responsive to the temperature of the air in the enclosure for controlling the position of the temperature control valve.

31. A heating system as set forth in claim 30 including a turbine inlet valve disposed within the primary conduit between the heat exchanger and the turbine, means for controlling the position of the turbine inlet valve generally inverse to the position of the temperature control valve so that source air flow through the primary conduit is controlled generally inverse to the source air flow through the bypass means.

* * * * *